(12) United States Patent
Whited

(10) Patent No.: US 7,273,314 B1
(45) Date of Patent: Sep. 25, 2007

(54) SEED TREATER

(76) Inventor: Jerrel L. Whited, 2041 Crawford Dr., Walla Walla, WA (US) 99362

( * ) Notice: Subject to any disclaimer, the term of this patent is extended or adjusted under 35 U.S.C. 154(b) by 0 days.

(21) Appl. No.: 09/638,017

(22) Filed: Aug. 14, 2000

(51) Int. Cl.
*B01F 7/20* (2006.01)

(52) U.S. Cl. .................. 366/172.1; 366/305; 366/313; 118/303

(58) Field of Classification Search ............... 422/269; 118/13, 303; 366/305, 313, 168.1, 171.1, 366/172.1, 172.2, 173.2
See application file for complete search history.

(56) References Cited

U.S. PATENT DOCUMENTS

| | | | | |
|---|---|---|---|---|
| 1,102,696 A | * | 7/1914 | Shiner | |
| 1,434,089 A | * | 11/1922 | Christensen | |
| 2,204,029 A | * | 6/1940 | Russell | |
| 4,503,803 A | * | 3/1985 | Barnes | |
| 5,891,246 A | * | 4/1999 | Lund | |
| 5,993,903 A | * | 11/1999 | Toepfer et al. | |

* cited by examiner

*Primary Examiner*—David Sorkin
(74) *Attorney, Agent, or Firm*—Floyd E. Ivey; Liebler, Ivey, Connor, Berry & St. Hilaire

(57) ABSTRACT

A drum for hanging from the ceiling constituting the floor of the second story of a grain elevator. The device is self-contained, and has top closure elements with a central feedhole, and a bottom closure element with a central discharge hole. It includes a rotary spreader and coaters, and an applicator, for spreading grains and mixing them, and for mixing fluid chemicals with the grains. Repeated mixing steps are performed. The grains are introduced into it from the second floor. It can receive the grains and chemicals from various sources including chutes from hopper bins, belts, and screws.

19 Claims, 6 Drawing Sheets

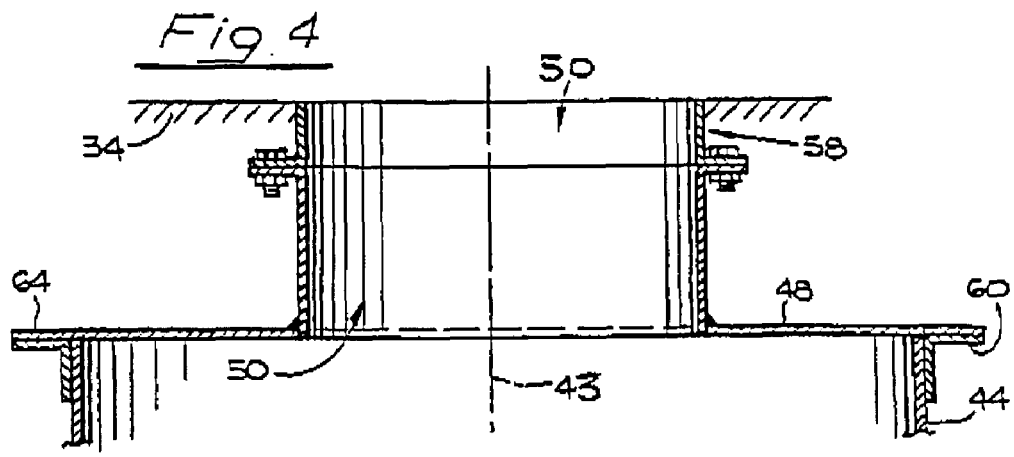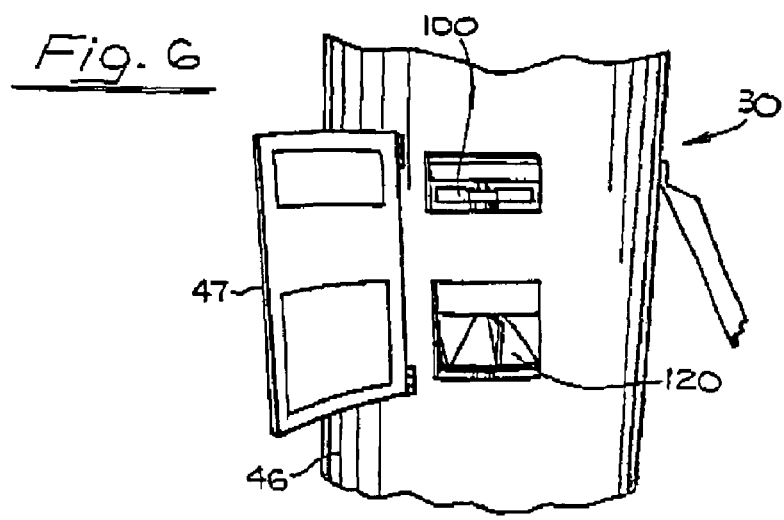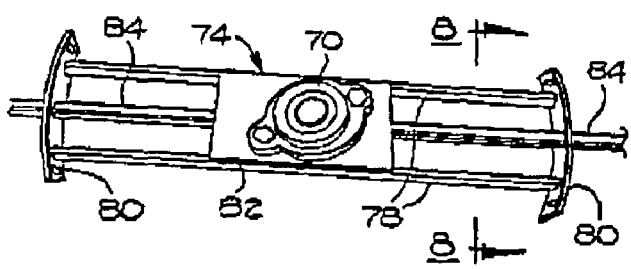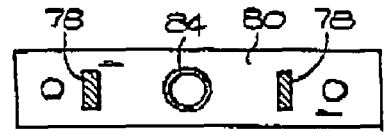

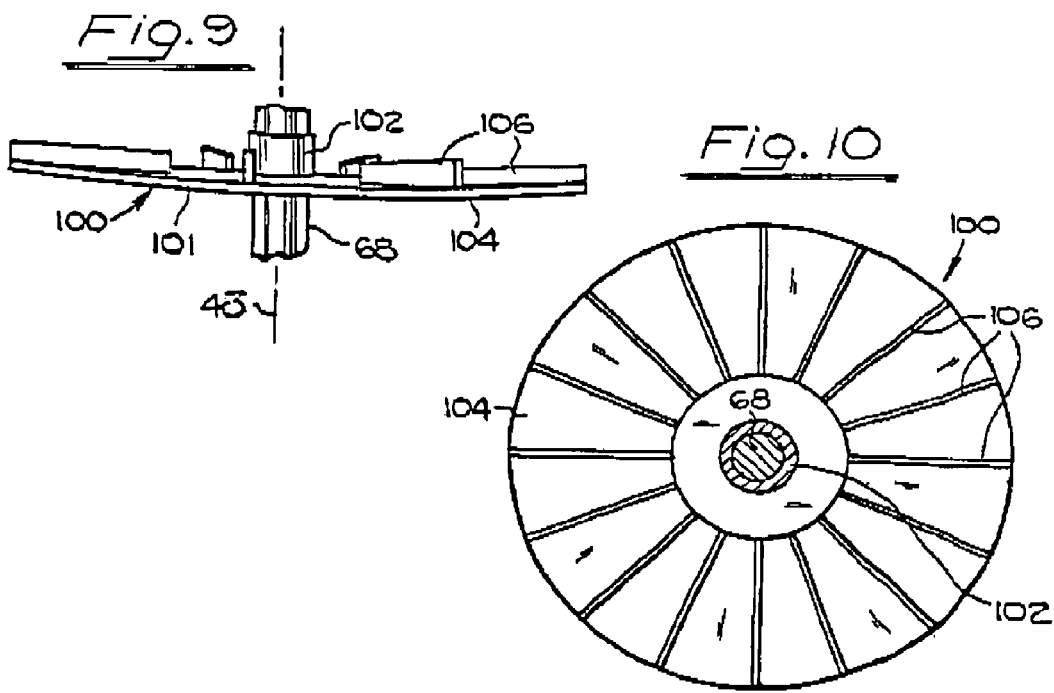
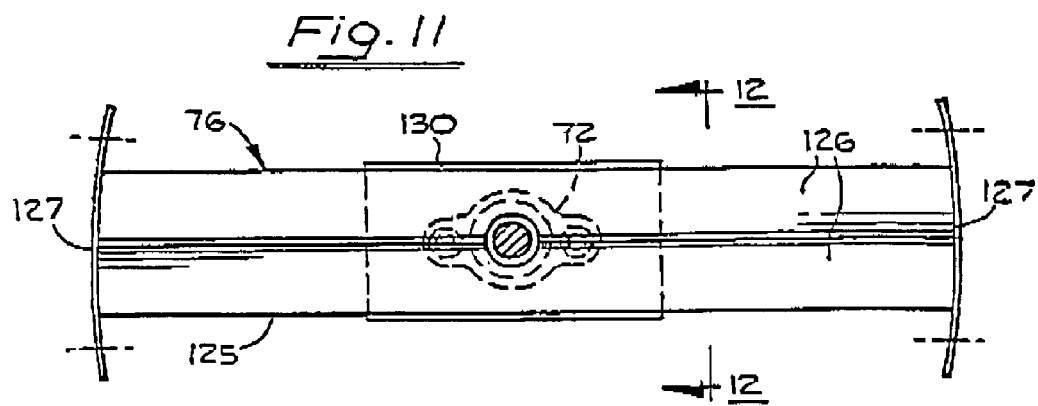
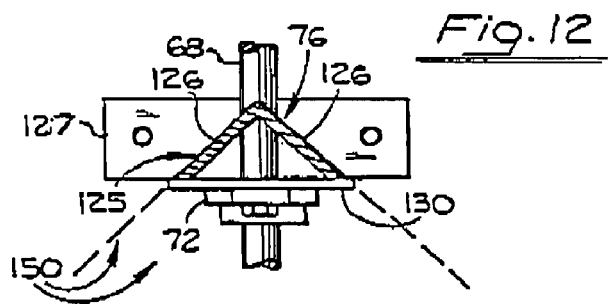

SEED TREATER

FIELD OF THE INVENTION

The invention resides in the general field of chemically treating seeds or grains as in a grain elevator. Heretofore, the seeds were treated in an upper floor of the elevator, utilizing stationary facilities for treating and mixing the various seeds. In such an arrangement, the various seeds, i.e. different kinds, e.g. wheat, oats, corn, etc., were contained in bins in the elevator and various devices were utilized for transporting the seeds to a common outlet, and in doing so, they were mixed in various selected proportions, and liquid chemicals were applied to the seeds. Such an arrangement was cumbersome, slow, and required much labor to produce the desired results. In a following step, a truck was driven into the elevator, below the place of mixing, and after the mixing and other treatment steps were performed, the resulting seed mixture was fed into the truck.

SUMMARY OF THE PRESENT INVENTION

The seed treater of the present invention is a self-contained unit, that is secured to the structure of the elevator such as being bolted on the ceiling at the first floor, and the truck is driven under the device. The seeds are introduced into the treater from above, on the second floor of the elevator, and are mixed and coated in the treater, as they are passing therethrough.

The treater of the present invention is capable of on-demand receiving seeds of various kinds for blending from bins on the second floor where they were previously stored.

The treater is capable of being fed by instrumentalities on the second floor, such as by conveyor, belt, screws, chutes from hopper bins.

The device of the present invention will function as an on-demand apparatus in filling orders, both as to chemicals and seed blending, in that upon initiating an order for treated seed, the ingredients, mainly the different kinds of seeds for mixing, and chemicals, are introduced into the device independently, and they are thoroughly mixed while passing through the device, flowing into the truck uninterruptedly, i.e. upon selecting the ingredients to be put in the seed combination, the device is made to operate, and continues until the order is completed.

Other features and advantages are that the device is relatively small in size, it is relatively inexpensive to manufacture, and it is convenient to mount in position for ingredients to be mixed and delivered to the truck.

Another great advantage is, although relatively small and of inexpensive construction, the device will treat great amounts of seeds at an extremely rapid rate.

Another important feature is that the device, because of its compact and light weight construction, can be easily mounted in operable position.

BRIEF DESCRIPTIONS OF THE FIGURES OF THE DRAWINGS

FIG. 4 is a sectional view taken approximately at line 4-4 of FIG. 3, showing the upper end of the device.

FIG. 6 is an exterior view of the seed treater with an access door in open position.

FIG. 7 is a perspective view of the upper bearing support.

FIG. 8 is a view taken at line 8-8 of FIG. 7.

FIG. 9 is a side view of the applicator from inside the surrounding wall.

FIG. 10 is a top view of the applicator taken at line 10-10 at the lower end of FIG. 9.

FIG. 11 is a top view taken at line 11-11 at the lower end of FIG. 5.

FIG. 12 is a sectional view taken at line 12-12 at the lower end of FIG. 11.

DETAILED DESCRIPTION

Figure 1:
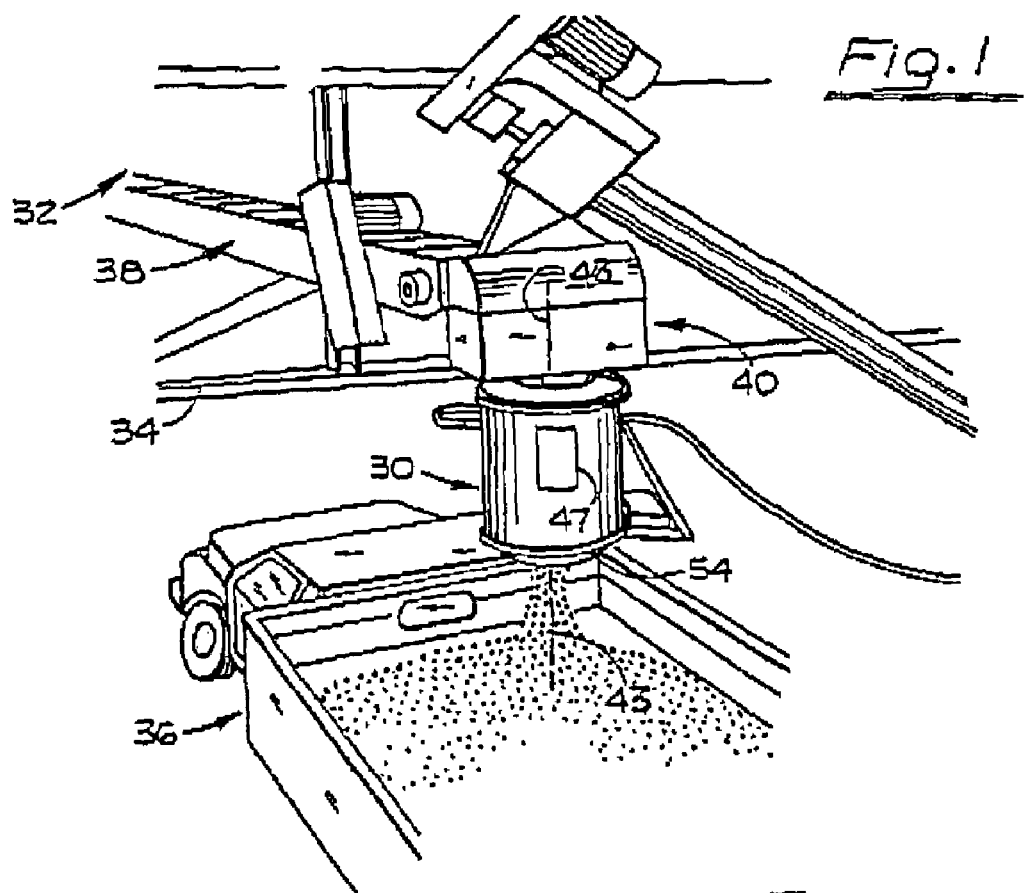
FIG. 1 is a perspective overall view of the background in which the treater is utilized, and including the seed treater itself.

Attention is directed to FIG. 1 showing the seed treater identified 30, mounted in position in a grain elevator. The elevator has a second floor, indicted generally at 32, and other structural elements are shown. A floor structure itself 34, is indicated, in which the seed treater is directly mounted. The seed treater is mounted at its top and it suspends from the floor structure, in position for a vehicle such as a truck 36, to drive into the elevator on the main floor, under the seed treater, to receive the grain from the latter. It is to be noted that the device is mounted only at one point, its top, as will be brought out in detail hereinbelow.

Figure 2:
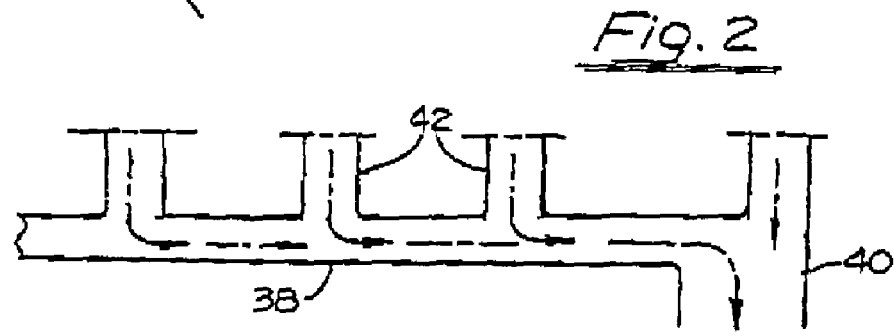
FIG. 2 is a diagrammatic view of the grain feeding instrumentalities on the second floor of the elevator leading to the seed treater.

FIG. 1 shows instrumentalities for conveying seed to the device. These may include a conveyor 38, having a terminal chamber 40, with an outlet leading into the seed treater. 10 Further attention is given to this feature, as represented diagrammatically in FIG. 2, which shows a conveyor 38, with other instrumentalities 42, leading thereinto, such as belts, chutes, screws, etc. The particular instrumentalities utilized for carrying seed to the device may be any of various kinds. The 15 seed treater 30, is cylindrical in shape with central axis 43 (FIGS. 1, 4, 5, 9, 14) disposed vertically. It includes a stationary drum 44 forming a surrounding wall 46, which has an access door 47. In the description herein, the seed treater is referred to as oriented in that position, i.e., vertically.

Figure 5:
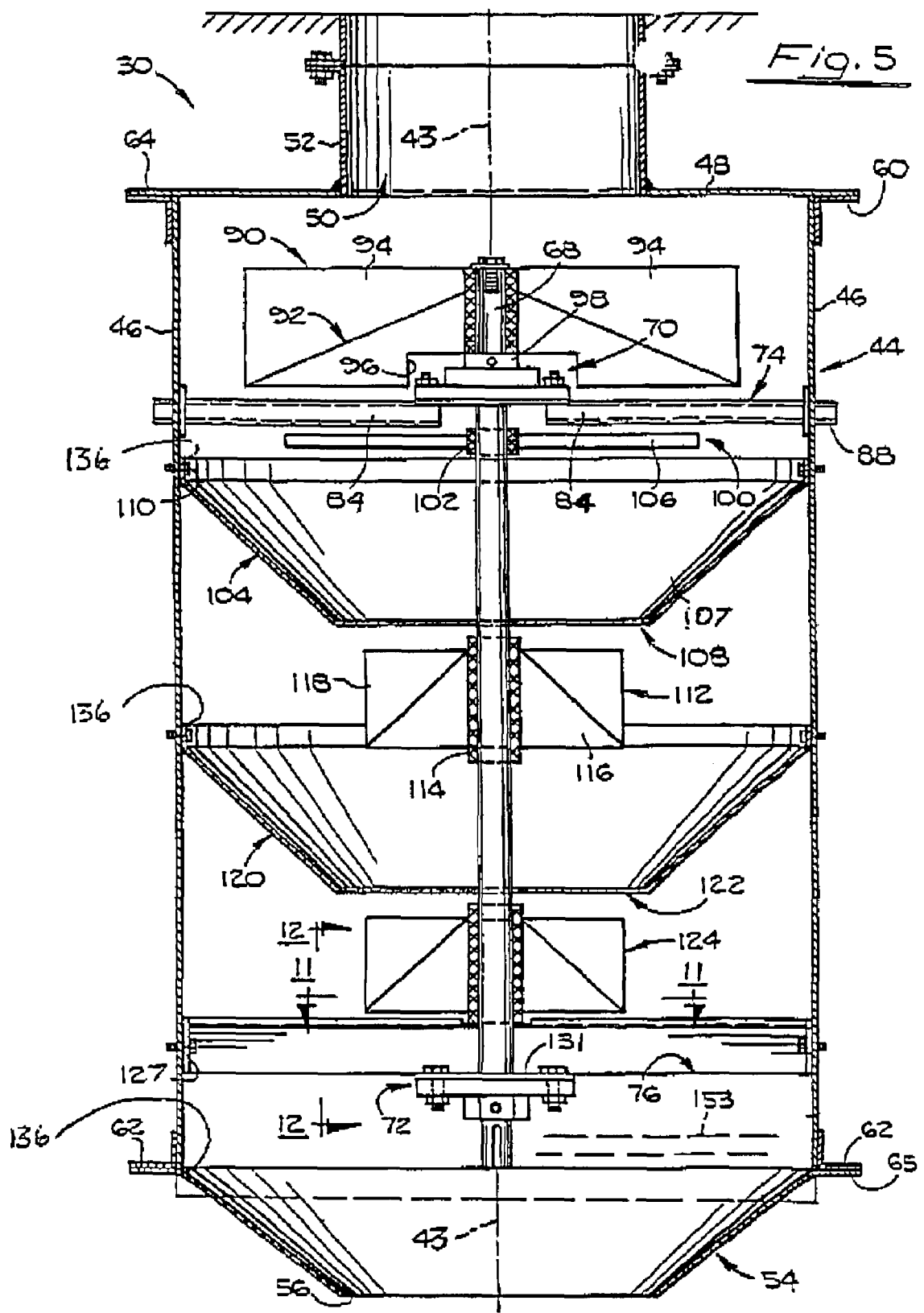
FIG. 5 is a vertical axial sectional view of the whole seed treater.

FIG. 5 includes most of the interior items, and FIG. 14, which is similar to FIG. 5, additionally shows wipers for wiping the bowls, as described below.

The device has a flat, annular top closure plate 48, with a central inlet opening or feed hole 50, surrounded by a cylindrical tube 52, and has a conical bottom closure plate 54, with a central discharge opening 56, forming a bottom bowl.

FIG. 4 shows the means for mounting the device on the ceiling, or the second floor. In this figure the second floor structure 34 is shown, and a hanger means 58 is provided for mounting the device directly on the floor structure. In the hanger means 58 is an opening 50 receiving grain from the outlet end of the conveyor 38 (FIG. 2) and directing it into the opening 50, in the device.

Attention is directed to FIG. 5, which is an axial sectional view of the entire device. In this view the cylindrical wall 46 is shown, having a surrounding outwardly directed transverse flange 60, at the top, and a similar transverse flange 62, at the bottom.

The top closure plate 48 shown in FIG. 4 is also shown in FIG. 5, this place having a radially extended peripheral flat flange 64, detachably secured to the flange 60, and welded to the tube 52 around the feed hole 50.

The bottom closure plate 54 has a peripheral transverse flange 65, secured to the flange 62, for mounting the plate onto the cylindrical wall 46.

The seed treater includes a main shaft 68, extending nearly the height of the drum 44, being driven by a drive means at the bottom, referred to below. The shaft is mounted in an upper bearing 70 and a lower bearing 72, the upper bearing 70 being mounted on an upper bearing support 74, and the lower bearing on and under a lower bearing support 76.

The upper bearing member 70 is shown in FIGS. 7 and 8 and is fixedly mounted in the device. It includes a pair of spaced parallel arms 78, with curved end plates 80, the latter being detachably secured to the inner surface of the wall 46, and having a central plate 82, on which the bearing 70 is directly mounted.

Mounted in the support 74, are tubes 84, arranged oppositely and on a common diameter for conveying liquid chemicals into the device. These tubes lead through the drum and under the bearing plate 82 and empty downwardly into the drum. The outer ends of the tubes 84 lead through the end plates 80, and the surrounding wall 46, through an exterior fitting 88, for attachment to lead-in lines 89 carrying the chemicals to the device.

Figure 3:
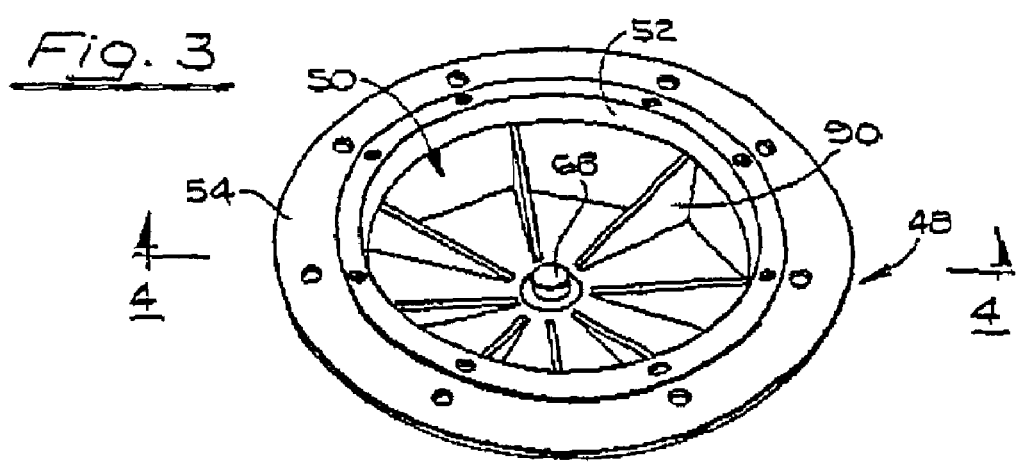
FIG. 3 is a perspective view of the top flange on the seed treater, and the adjacent part of the interior.

Mounted on the upper end of the shaft 68 above the bearing support 74 is a rotary spreader 90 (FIG. 5), also shown in FIG. 3. This spreader rotates with the shaft and includes a bottom plate 92, of conical shape, and vertical blades 94 opening radially outwardly, following the slope of the bottom plates, i.e., downwardly. The bottom plate and blades have a central opening 96, for receiving the upper bearing 70.

Mounted on the shaft 68, below the bearing support 74, is an applicator 100 (FIGS. 9 and 10). This applicator includes a central hub 102, secured to the shaft, and a bottom plate 101, and vertical radial blades 106. This applicator is of lesser depth than the spreader 90.

In the steps of operation, in this phase, it is explained that the grain is introduced through the top opening 50 and it falls on the spreader 90, which throws the grain out against the surrounding wall 46. The liquid chemicals falling from the tubes 84 are thrown outwardly by the applicator 100, also into engagement with the falling grain and the surrounding wall.

The thin mass of grain which was thrown out by the spreader 90, flows down along the wall, and mixes with the chemicals and as it reaches the; Level of the applicator, the wet mixture then flows into an upper bowl 104 which is fixedly mounted in the drum. This bowl includes a surrounding annular imperforate wall 107, tapering downwardly to a central discharge outlet opening 108, and at its upper end is a cylindrical flange 110, by which it is mounted on the inner surface of the surrounding wall.

Mounted below the upper bowl 104, is an upper coater 112, which is generally similar to the spreader 90, but of different dimensions, being smaller in diameter than the latter. The coater includes a central hub 114, by which it is mounted on the shaft 68 for rotation therewith. It includes bottom plates 116, and vertical radial blades 118 opening radially outwardly.

This upper coater 112, is positioned close to the upper bowl 104, and as the grain and fluid mixture flows down the bowl, it falls into the upper coater 112, and is again thrown out against the surrounding wall 46. This action produces a mixing effect, which is added to that of the spreader 90, and upper bowl 104.

Below the upper coater 112, is a central bowl 120, identical in construction with the upper bowl 104, and mounted in a similar manner in the drum. This bowl receives the mixture from the wall 46, in the area radially outwardly from the upper coater 112 and the mixture then flows through this central bowl and down through its bottom opening 122.

Below the central bowl 120, is a lower coater 124, which is identical in construction with the upper coater 112, and operable for throwing the mixture that falls into it from the central bowl 120, in outward direction against the surrounding wall. At his point the mixture as it engages the outer wall continues to flow down through the drum.

The lower bearing support 76, identified above, is constructed as a hogback. FIGS. 11 and 12 show its detail construction. It includes a main structural member 125, made up of a pair of plates 126, disposed at an angle to each other and together extending diametrically across the drum. It is disposed with the apex of the angle upwardly. At the ends are mounting plates 127, having apertures for detachably mounting on the surrounding wall as shown in FIG. 5. A central plate 131, is 5 mounted across the lower edges of the plates 126, on which the lower bearing means 72 is secured.

The hogback 76, serves to divide the mass of grain descending as shown in FIG. 1, the blades 126, deflecting the grain mixture sideways, which falls into the bottom bowl 54, from which it flows through the central discharge opening 56.

Means is provided for facilitating flow of the mixture through the device. The mixture tends to become sticky due to the inherent stickiness of the chemicals, and also because of the mixture of dust and dirt with the chemicals. This produces what is actually a mud, retarding the flow of the mixture.

This mud accumulates most objectionably in the bowls 104, 120 and 54.

Figure 14:
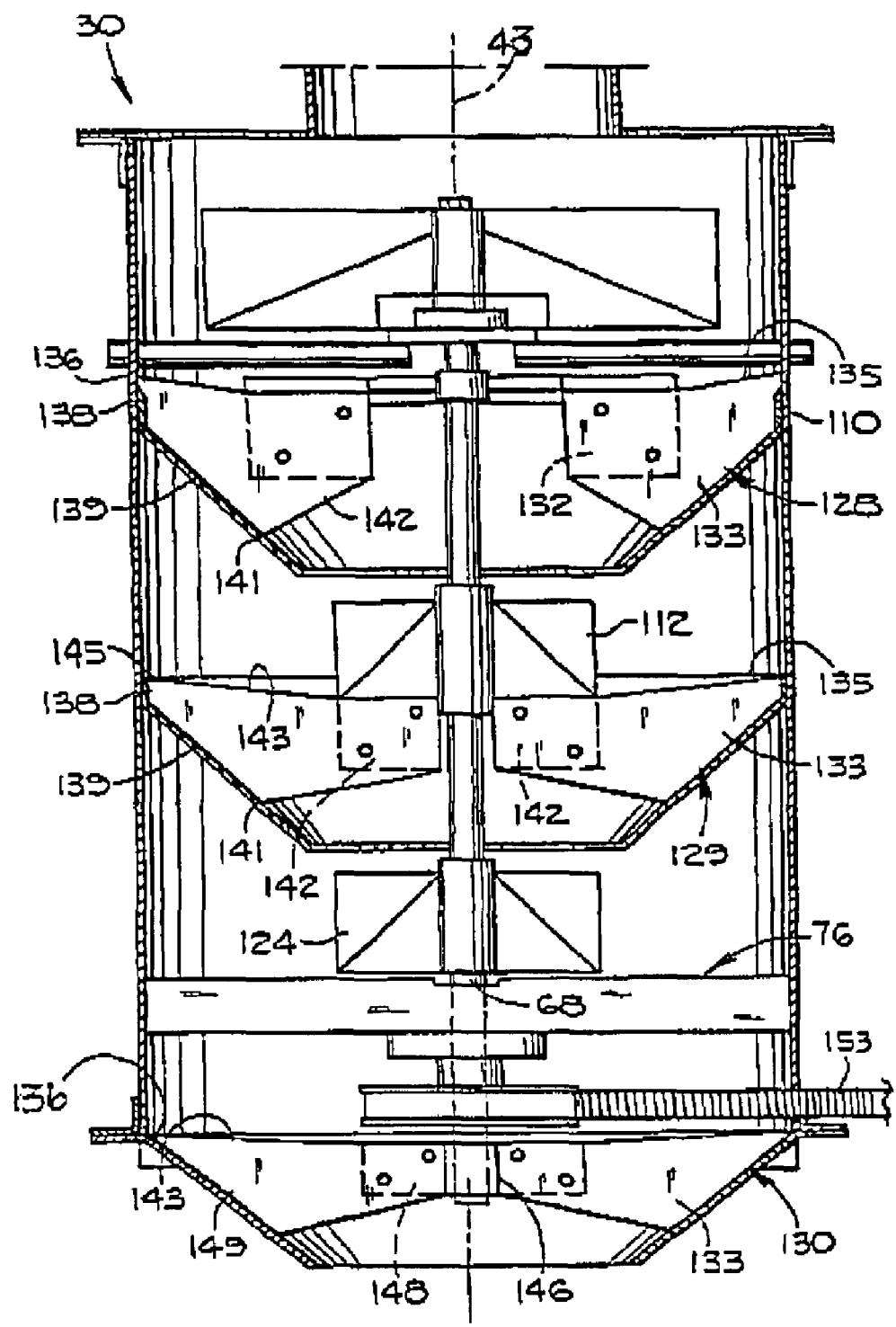
FIG. 14 is a view, similar to FIG. 5, showing wipers for wiping the bowls.

To overcome this problem three pairs of wipers 128, 129, 130 are provided as shown in FIG. 14. In each pair, the wipers are mutually identical, and arranged symmetrically, on a common diameter. The wipers in the different pairs differ in size and shape.

Each wiper 128 includes a small flat steel mounting piece 132 welded to the applicator, on the under surface of the latter and at the periphery thereof, and a blade 133 extending down into the upper bowl. The blade is positioned at the periphery of the bowl. Its upper edge 135 is inclined upwardly in radial outward direction to a point 136 above the flange 110 of the bowl, engaging the wall of the drum at that point. Its radially outer edge 138 also engages the flange. The lower edge 139 of the blade engages the wall of the bowl down to a point 141, and its lower/inner edge 142 extends up to the mounting piece 132. The blade 133 is made of rubber belting material of known kind, and accordingly is relatively stiff and will yield upon engaging an obstacle.

The blades 133 are spaced apart, engaging the bowl only at the outer portion thereof, and leaving an empty space therebetween.

The wiper blades, in each pair, extend approximately three-fourths of the slant height of the sloped bottom, from the upper edge of the latter, leaving the lower one-fourth open.

The wipers, upon rotation with the shaft, wipe the bowl, and wipe the mixture and work it inwardly so as to position it directly over the bottom outlet opening. This action forms a dense column at the center which as a mass moves downwardly, overcoming the tendency of the accumulation of the mixture on the wall of the bowl.

In the case of the wipers 129, the mounting pieces 142 are secured to the upper coater 112 which is of lesser diameter than the applicator 100, and the blades are therefore radially longer than the blades in the wipers 128. The upper edged 143 is inclined upwardly and terminates at 145 at the upper edge of the flange 110.

The wiper 130 includes a central hub 146 mounted on the lower end of the shaft 68 to which mounting pieces 148 are welded.

The blades 149 engage the inner surface of the bottom bowl 54 at the upper part of the latter. Thus the three bowls are wiped on the mixture, producing faster and more efficient flow.

The hogback 76 leaves a zone 150 (FIG. 12), which is devoid of the grain mixture. A drive motor 151 (FIG. 13) is mounted on an exterior platform 152, and a drive belt 153 therefrom drives the central shaft 68 (see also FIG. 14). This belt extends through the void zone 150, and is thus protected from the falling grain mixture, but however, the grain mixture is enabled to fall freely without interruption over the top of the hogback 76. Diagonal braces 154 (FIG. 13), secured at their upper ends to the drum, provide support for the platform, and thus the drive motor, and this structure and support are part of the self-contained nature of the device.

It is desired that the grain and chemicals be mixed extremely thoroughly in the treater. In the present case, there are no chemicals mixed outside the treater. The chemical and grain mixing provided in the seed treater is extremely intense, and efficient. The spreader 90, it located directly under the top inlet opening 50 and receives all of the grain falling into the unit. The grain then is thrown out against the surrounding wall, as stated, and in this step the grain forms a thin mass on the wall. This mass of grain flows or slides down the wall, and at the next step, at the level of the agitator 100, is injected with chemicals. The purpose of the agitator is to throw the atomized fluid chemicals outwardly. The mixing of the grain continues, and the chemicals also mix with the grain at this stage, and progressing downwardly, the grain mixture with the chemicals flows into the bowl 104. The grain mixture then slides down the inclined surface of the bowl and exits through the central opening 108.

Each coater is of lesser diameter than the bottom opening in the bowl above it, but due to the inclination of each bowl, the mixture is directed inwardly, in falling, into the coater below the bowl.

In all of these actions, the grain is mixed and remixed, and the liquid chemicals are mixed therewith and simultaneously so. It is desired that the liquid chemicals thoroughly coat all the surfaces of the individual kernels of the grain, and the repeated reversing in direction produces a sliding, turning and rubbing action between the kernels, thus completely distributing the chemicals around the total surfaces of the individual kernels. In addition to vertical falling movement of the kernels of this action, there is a swirling effect due to the rotation in the various members. This swirling action takes place throughout, and any interruption of that swirling action is again reestablished in the repeated action of the coaters.

Figure 13:
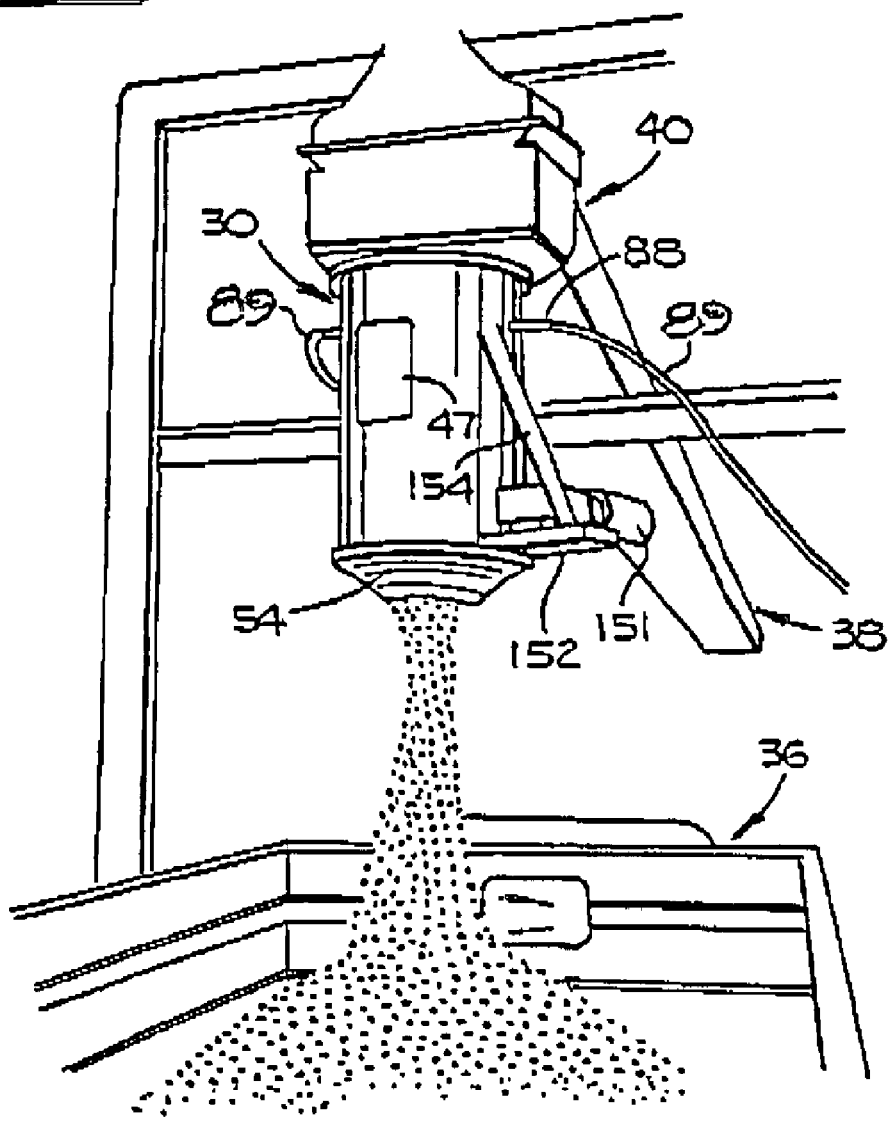
FIG. 13 is an exterior view of the treater, showing the drive motor and its mounting platform, and including a portion of the structure of the elevator, and a truck.

The swirling effect is shown to continue after the mixture leaves the unit, as shown in FIG. 13.

FIG. 13 also shows the fluid lines 89, leading from a supply of chemicals to the unit, and leading into the outlets 88 (FIG. 5) as referred to above.

The bottom closure plate 54, as shown well in FIG. 14, is tapered similarly to the bowls, 104, 120, confining the grain as it is being discharged, to a relatively narrow stream at the center.

A unit as described above, having a drum in the 20 neighborhood of 40" in length and 24" in diameter, has a capacity for treating grain at the rate of about 1500+ bushels per hour or 45+ tons per hour. Any desired capacity may be accomplished by selectively changing the size of the machine. The drive motor 151 is sized to the unit.

The motor may be of fixed RPM, or of variable speed. One motor drives all the internal moving parts of the device.

The invention claimed is:

1. A self-contained seed treater comprising,
   a drum having a surrounding wall and a top opening and a central discharge opening (56),
   a rotatable shaft mounted in the drum on a vertical axis,
   a spreader mounted on the shaft adjacent the top of the drum, and adapted to receive seed flowing downwardly through the top opening, and operable for throwing the seed outwardly into engagement with the surrounding wall, the spreader (90) having a bottom plate (92) which is of conical shape,
   an upper bowl below the spreader, and tapering downwardly and having a bottom opening, and being otherwise imperforate and secured to the surrounding wall without space between itself and the surrounding wall,
   whereby all the seed on the surrounding wall thrown from the spreader will flow into the upper bowl,
   the construction of the seed treater being such as to enable the seed in the upper bowl to flow through the bottom opening in the upper bowl and through the central discharge opening (56) of the seed treater into a receptacle, and
   the seed treater including power transmitting means operably connecting power means for rotating the shaft (68).

2. A seed treater according too claim 1 wherein,
   the drum has a top closure plate (48) in which the top opening is formed, and
   the drum includes a flange unit on the top closure plate (48) having a central opening co-axial with the top opening of the drum and a flange element spaced axially from the top closure plate (48) and extending transversely of the axis, for detachably securing it the drum (44) to an overhead supporting structure, and
   a downwardly directed cone shaped conical bottom closure plate (54), with a central discharge opening (56) forming the bottom opening and forming a bottom bowl, the bottom closure plate (54) secured to the surrounding wall, the bottom bowl coaxially positioned with the drum and surrounding imperforate element positioned for receiving the grain falling through the drum.

3. A seed treater according to claim 1 and including,
   the spreader (90) bottom plate (92) having vertical blades (94) opening radially outwardly following the downward slope of the bottom plate (92),
   upper and lower bearing means for supporting the shaft, bearing supporting means supporting the bearing means within the drum, and the bearing supporting means being operable for detachably mounting the bearing supporting means on the surrounding wall.

4. A seed treater according to claim 3 and including, an upper rotary coater below the upper bowl and secured to the shaft, and positioned for receiving seed and fluid from the upper bowl and operable for throwing seed and fluid outwardly against the wall of the drum, and the upper coater (112), is smaller in diameter than the spreader (90) and has a central hub 114 by which the upper coater (112) is mounted on the shaft (68) for rotation therewith; the upper coater (112) having bottom plates (116) of conical shape, and vertical-radial blades (118) opening radially outwardly.

5. A seed treater according to claim 4 and including, a center bowl substantially identical with the upper bowl below the upper coater, and fixedly mounted in the drum substantially identically to the mounting of the upper bowl.

6. A seed treater according to claim 5 and including, a lower rotary coater substantially identical with the upper rotary coater and mounted below the central bowl and mounted substantially identically to the mounting of the upper rotary coater, and the lower rotary coater (124), is smaller in diameter than the spreader (90) and has a central hub (114) by which the lower rotary coater (124) is mounted on the shaft (68) for rotation therewith; the lower coater (124) having bottom plates (116) of conical shape, and vertical-radial blades (118) opening radially outwardly.

7. A seed treater according to claim 6 and including, a hogback adjacent to the lower end of the drum and below the central bowl, a conical bottom closure plate (54), with a central discharge opening (56), forming a bottom bowl (54) below the hogback (76); and the hogback being constituted by a rigid elongated piece extending diametrically across the drum and secured at its ends to the surrounding wall includes a main structural member (125), made up of a pair of plates (126), disposed at an angle to each other and is disposed with the apex of the angle upwardly, and lower bearing means mounted on and under the hogback and supporting the shaft.

8. A seed treater according to claim 7 and including, power means mounted on the exterior of the drum, and power transmitting means operably connecting the power means and the shaft and extending into the drum and underlying the hog back to the shaft; the power transmitting means thereby shielded by the hogback from grain falling though the drum.

9. A method of treating seeds utilizing the apparatus of claim 8 comprising:

adapting the apparatus for use in an elevator which includes a building with an elevated floor having a supply opening therethrough and a space below the floor for accomodating vehicles for receiving the seeds, providing seeds to be treated on the elevated floor, providing a self-contained treating unit having a top opening and a bottom opening for flow of seeds therethrough and through the treating unit, and treating the seeds as the seeds flow through the mixing unit; the bottom opening being the central discharge opening (56).

10. A method according to claim 9 and including the step, introducing fluid into the treating unit with the introduction of the seeds, and treating the seeds with the fluid.

11. A method according to claim 10 for use in such elevator that includes a driveway in said space in the building for movement of vehicles on the driveway, and including the step, introducing treated grain from the treating unit on the driveway and moving the vehicle from the building.

12. A seed treater according to claim 3, wherein, the drum is cylindrical and the bearing supporting means includes upper and lower bearing support means including a protected upper bearing support between the spreader and the upper bowl, the upper bearing support extends diametrically across the drum and includes spaced apart side bars positioned vertically on edge, and having end plates also positioned on edge by which the upper bearing support is detachably secured to the surrounding wall, the upper bearing support also including a central horizontal plate secured to the side bars, and the upper bearing means is detachably and fixedly mounted on the end plates, whereby relatively great space is provided outwardly of the side bars, and between the side bars radially outwardly beyond the central horizontal plate to enable the seed to flow freely downwardly through the drum.

13. A seed treater according to claim 12 wherein, the upper bearing support includes holes in curved end plates (80) for receiving outlet ends of fluid flow tubes (84) from the exterior leading to a position adjacent the shaft for conducting fluid into the drum to a position adjacent the shaft.

14. A seed treater according to claim 13 and including a rotary applicator mounted on the shaft and rotatable therewith, and the rotary applicator is positioned between the upper bearing support and the upper bowl, and thereby positioned below the fluid flow tubes (84) for receiving thereon fluid introduced into the drum.

15. A seed treater according to claim 14 wherein, at least one upper coater (112), is smaller in diameter than the spreader (90) and has a central hub (114) by which the upper coater (112), is mounted on the shaft 68, for rotation therewith; the upper coater (112) having bottom plates (116) of conical shape, and vertical-radial blades (118) opening radially outwardly; the upper coater (112) is mounted below the upper bowl (104);

the upper bowl (104) fixedly mounted in the drum (44);

at least one central bowl (120) fixedly mounted in the drum (44) below at least one upper coater (112), and tapering downwardly and having a bottom opening, and being otherwise imperforate and secured to the surrounding wall without space between itself and the surrounding wall, the at least one central bowl (120) receives the mixture from the wall (46), in the area radially outwardly from the upper coater (112) and the mixture then flows through this central bowl and down through its bottom opening (122);

at least one lower coater (124), is smaller in diameter than the spreader (90) and has a central hub which the lower coater (124), is mounted on the shaft (68), for rotation therewith; the lower coater (124) having bottom plates of conical shape, and vertical-radial blades opening radially outwardly; the lower coater (124) is mounted below the at least one central bowl (120);

the at least one lower coater (124) mounted on the shaft (68) above the hogback (76);

below the hogback (76) a conical bottom closure plate (54), with a central discharge opening (56), forming a bottom bowl (54); and at least one pair of wipers (128, 129, 130) are in wiping contact with each of the said upper bowl (104), the at least one central bowl (120) and the bottom bowl (54); each pair of wipers at each of the upper bowl (104), the at least one central bowl (120) and the bottom bowl (54) are mutually identical, and arranged symmetrically, on a common diameter, each of the at least one pari of wipers (128, 129, 130) are secured to the shaft (68) or the upper coater (112) for rotation with the rotation of the shaft (68);

the wipers in the different pairs for the upper bowl (104), the at least one central bowl (120) and the bottom bowl (54) differ in size and shape to accommodate the shape of the respective upper bowl (104), the at least one central bowl (120) and the bottom bowl (54);

for each wiper pair, each wiper (128, 129, 130) includes a mounting piece (132, 142, 146) and a blade (133) extending down into the respective upper bowl (104), at least one central bowl (120) and bottom bowl (54); the blade (133) is positioned at the periphery of each of the respective bowls (104, 120 and 54); the blade (133) having an upper edge (135) which is inclined upwardly in radial outward direction to a point (136) above a flange (110) of the each of the respective upper bowl and at least one central bowl (104, 120) and to a point at the uppermost point of the bottom bowl (54) such that the blade (133) engages the wall of the drum;

each blade (133) has a radial outer edge (138) which also engages the flange (136) with wiping contact; a lower edge (139) of the blade (133) engages the wall of the respective bowl (104, 120, 54) down to a point (141) proximal the respective bowl bottom or discharge opening (108, 122, 56); each of the respective blades (133) has a lower/inner edge (142) which extends up to the mounting piece (132);

the blade (133) is made of relatively stiff yet flexible material (10) which will yield upon engaging an obstacle;

the blades (133) are spaced apart, engaging the bowl only at the outer portion thereof, and leaving an empty space therebetween, the blades (133), in each pair, extend approximately threefourths of a slant height of the sloped bottom of each of the respective bowls (104, 120, 54), from an upper edge of the each of the respective bowls (104, 120, 54) leaving the lower one-fourth of the slant height of each of the sloped bottoms of each of the respective bowls (104, 120, 54) open;

the wipers (128, 129, 130), upon rotation with the shaft (68), wipe the respective bowls (104, 120, 54) and wipe the mixture and work it inwardly so as to position the mixture directly over the bottom or discharge opening (108, 122, 56) of each of the respective bowls (104, 120, 54);

each of the spreader, applicator, and upper coater and the at least one lower coater, includes a bottom plate extending substantially its full area, and vertical blades extending upwardly from bottom plate, and the spreader (90) bottom plate (92) and blades (94) have a central opening (96), for receiving the upper bearing (70);

the upper coater (112), is positioned close to the upper bowl (104), and as the grain and fluid mixture flows down the upper bowl (104), it falls into the upper coater (112), and is again thrown out against the surrounding wall (46), this action produces a mixing effect, which is added to that of the spreader (90), and upper bowl (104);

the at least one central bowl (120) receives the mixture from the wall (46), in the area radially outwardly from the upper coater (112) and the mixture then flows through the at least one central bowl (120) and down through its bottom opening (122);

the lower coater (124) is operable for throwing the mixture that falls into it from the at least one central bowl (120), in outward direction against the surrounding wall (46).

16. A seed treater according to claim 1 and including a rotary applicator between the spreader and the upper bowl, the applicator (100) has a central hub (102) secured to the shaft, and a bottom plate (101) with vertical radial blades (106); the applicator (100) is of lesser depth than the spreader (90), and is mounted on the shaft and rotatable therewith and positioned for receiving fluid from the terminal ends of fluid flow tubes (84), and operable for throwing fluid that is placed thereon outwardly into engagement with the falling seed kernels on the wall of the drum.

17. A seed treater according to claim 1 and including, in addition to the upper bowl, a central bowl and a bottom bowl, all concentric with the axis and through all of which the seed mixture flows, and the seed treater includes rotary wipers secured to the shaft and extending into the respective bowls, and operable in responses to rotation of the shaft, for wiping the floor of the bowls.

18. Apparatus for treating seed, comprising, a cylindrical drum having top and bottom openings, the bottom opening being a central discharge opening (56);

the drum including means for mounting it on and below a floor in a building, and adapted to receive grains of different characteristics through the top opening, for mixing grains, the drum including means therewithin for mixing the grains in response to the fall of the grains through the drum, a spreader mounted on a shaft adjacent the top of the drum, and adapted to receive seed flowing downwardly through the top opening, and operable for throwing the seed outwardly into engagement with the surrounding wall, the spreader (90) having a bottom plate (92) having a conical shape, the spreader (90) bottom plate (92) having vertical blades (94) opening radially outwardly following the downward slope of the bottom plate (92), and the apparatus including power means mounted on the drum for operating the mixing means.

19. Apparatus according to claim 18 and including, fluid flow means (84) leading from the exterior into the interior of the drum for conducting liquid chemicals into the drum for mixing with the grains in the drum.

* * * * *